United States Patent [19]

Toyoguchi et al.

[11] Patent Number: 4,851,309

[45] Date of Patent: Jul. 25, 1989

[54] RECHARGEABLE ELECTROCHEMICAL APPARATUS AND NEGATIVE ELECTRODE THEREOF

[75] Inventors: Yoshinori Toyoguchi, Yao; Junichi Yamaura, Osaka; Tooru Matsui, Moriguchi; Takashi Iijima, Hirakata, all of Japan

[73] Assignee: Matsushita Electric Industrial Co., Ltd., Osaka, Japan

[21] Appl. No.: 935,169

[22] PCT Filed: Mar. 6, 1984

[86] PCT No.: PCT/JP84/00088

§ 371 Date: Nov. 5, 1984

§ 102(e) Date: Nov. 5, 1984

[87] PCT Pub. No.: WO84/03591

PCT Pub. Date: Sep. 13, 1984

Related U.S. Application Data

[63] Continuation of Ser. No. 674,927, Nov. 5, 1984, abandoned.

[30] Foreign Application Priority Data

Mar. 7, 1983 [JP] Japan ................................. 58-36878
Aug. 29, 1983 [JP] Japan ............................... 58-158329
Feb. 10, 1984 [JP] Japan ................................. 59-23347

[51] Int. Cl.[4] ........................ H01M 6/14; H01M 4/36
[52] U.S. Cl. ................................... 429/194; 429/222; 429/226; 429/229
[58] Field of Search ............... 429/194, 229, 222, 226; 29/623.1

[56] References Cited

U.S. PATENT DOCUMENTS

| | | | |
|---|---|---|---|
| 1,195,955 | 8/1916 | Day | 420/524 |
| 2,837,427 | 6/1958 | Monaco | 420/524 |
| 2,982,705 | 5/1961 | Sakano et al. | 420/513 X |
| 3,506,490 | 4/1970 | Buzzelli | |
| 4,330,601 | 5/1982 | Dey | 429/105 |
| 4,383,358 | 5/1983 | Peled et al. | 29/623.1 |
| 4,450,213 | 5/1984 | Dey et al. | 29/623.1 |

FOREIGN PATENT DOCUMENTS

| | | |
|---|---|---|
| 2206593 | 6/1974 | France . |
| 56-86463 | 7/1981 | Japan . |
| 56-91370 | 7/1981 | Japan . |
| 0141869 | 9/1982 | Japan . |
| 0141870 | 9/1982 | Japan . |

OTHER PUBLICATIONS

Dey, A. N., "Electrochemical Alloying of Lithium in Organic Electrolytes", J. Electrochem: Soc., vol. 118, No. 10, (Oct. 1971), pp. 1547–1549.

Bailar, J. C., Jr., Ed., *Comprehensive Inorganic Chemistry*, vol. 3, Pergamon Press, pp. 202–204.

*Primary Examiner*—Stephen J. Kalafut
*Attorney, Agent, or Firm*—Spencer & Frank

[57] ABSTRACT

A rechargeable negative electrode for an electrochemical apparatus using nonaqueous electrolytes, said electrode comprising an alloy comprising (1) at least one metal selected from the group consisting of Sn, Pn, In and Bi and (2) Zn or Zn and Cd, as well as a rechargeable electrochemical apparatus comprising a combination of said negative electrode with a positive electrode having reversibility in charging and discharging. The above-mentioned negative electrode reversibly absorbs and desorbs alkali metal ions, as the result of charge and discharge, in nonaqueous electrolyte containing alkali metal ions. It undergoes no pulverization even after repeated charge and discharge, and maintains its shape stably, so that it has a long charge-and-discharge cycle life. Further, since it can absorb a large quantity of alkali metal per unit volume, it is of high energy density.

15 Claims, 12 Drawing Sheets

Zn CONTENT (% BY WEIGHT) IN Sn-Pb-Zn ALLOY

Bi CONTENT (% BY WEIGHT)
IN Sn-Bi-Zn ALLOY

Cd CONTENT (% BY WEIGHT)
IN Pb-Zn-Cd ALLOY

Cd CONTENT (% BY WEIGHT)
IN Sn-Zn-Cd ALLOY

Cd CONTENT (% BY WEIGHT)
IN Bi-Zn-Cd ALLOY

Cd CONTENT (% BY WEIGHT)
IN Sn-Zn-Cd ALLOY

RECHARGEABLE ELECTROCHEMICAL APPARATUS AND NEGATIVE ELECTRODE THEREOF

This application is a continuation of application Ser. No. 06/674,927, filed Nov. 15th, 1984 now abandoned.

BACKGROUND OF THE INVENTION

1. Field of the Invention

The present invention relates to a rechargeable electrochemical apparatus using nonaqueous electrolyte, more particularly a nonaqueous electrolyte secondary battery, and a rechargeable negative electrode.

2. Background of the Art

As nonaqueous electrolyte secondary batteries use alkali metals such as lithium and sodium as negative electrodes, there has been to date actively pursued the development of those batteries that use, as positive-electrode active materials, various intercalation compounds and the like including titanium disulfide ($TiS_2$) and, as electrolytes, organic electrolytes obtained by dissolving lithium perchlorate or the like in an organic solvent such as propylene carbonate. These secondary batteries feature high battery voltages high energy density, owing to the use of alkali metals in the negative electrode.

However, the secondary batteries of this kind have not yet been put to practical use to date. The main reason for this is that the number of times of possible charge-and-discharge is small (charge-and-discharge cycle life is short) and the charge-and-discharge efficiency in the charge-and-discharge cycle is low. This is caused largely by deterioration of the negative electrode. The lithium negative electrode mainly used at present comprises plate-formed metallic lithium pressbonded to a screen-formed current collector formed of nickel or the like. During the discharging stage, metallic lithium is dissolved into the electrolyte as lithium ions. But, in the charging stage, it is difficult to precipitate the lithium into plate form as before discharge. Rather, there occurs such phenomena that dendrite-like (arborescent) lithium is formed, which falls off breaking near the root, or the lithium is precipitated in small-bead (moss-like) form and disconnects itself from the current collector. Consequently, the battery becomes incapable of being charged and discharged. Further, it often occurs that the dendrite-like metallic lithium thus formed penetrates the barrier separating the positive electrode from the negative electrode and comes into contact with the positive electrode, causing short-circuit, which results in the failure of the function of the battery.

Various methods have been tried up to the present to obviate the defects of the negative electrode mentioned above. In general, there are reported methods which comprise altering the material of the negative-electrode current collector to improve its adhesion to the precipitating lithium or methods which comprise adding to the electrolyte an additive for preventing the formation of dendrite-like metal. But these methods are not always effective. Altering the current collector material is effective for lithium precipitating directly onto the curent collector material; but on further continuation of charge (precipitation), lithium precipitates upon the previously precipitated lithium, whereby the effect of the current collector material is lost. The additives are effective in the early stage of charge-and-discharge cycle; but with further repetition of the cycle, most of the additives decompose owing to oxidation-reduction reactions or the like in the battery, thus losing their effectiveness.

More recently, it has been proposed to use an alloy with lithium as the negative electrode. A well known example is lithium-aluminum alloy. In this case, there are disadvantages in that, although a uniform alloy is formed initially, the uniformity disappears on repetition of charge and discharge and, particularly when the proportion of lithium is large, the electrode becomes fine-grained and disintegrates. It has also been proposed to use a solid solution of silver and alkali metal [Japanese patent application kokai (laid-open) No. 73,860/81; U.S. Pat. Nos. 4,316,777 and 4,330,601]. In this case, it is described that no disintegration occurs as with the aluminum alloy; but only a small amount of lithium goes into the alloy at a sufficiently high rate and sometimes metallic lithium precipitates without alloying itself; to avoid this, use of a porous body or the like has been recommended. Accordingly, the charge efficiency is poor; with alloys containing large amount of lithium, the pulverization caused by charge-and-discharge is gradually accelerated, resulting in sharp decrease in cycle life.

Further, there is an idea of using lithium-mercury alloys [Japanese patent application kokai (laid-open) No. 98.978/82] or of using lithium-lead alloy [Japanese patent application kokai (laid-open) No. 141,869/82]. In the case of lithium-mercury alloys, however, the negative electrode changes into mercury metal in the form of liquid droplets as the result of discharge, and cannot maintain the form of the electrode. In the case of lithium-lead alloys, the pulverization of the electrode due to charge-and-discharge is more severe than in silver solid solution.

Further, it is conceivable to use lithium-tin or lithium-tin-lead alloy. But when these alloys are used, the pulverization of the alloy also occurs with the increase of the amount of lithium incorporated into alloy on charging, which makes maintaining the form as an electrode impossible.

Thus, no negative electrode rechargeable in a nonaqueous electrolyte has yet been found that can be satisfactorily used in practice.

SUMMARY OF THE INVENTION

An object of the present invention is to provide a rechargeable negative electrode for an electrochemical apparatus including the nonaqueous electrolyte secondary battery described above and to provide a rechargeable negative electrode that absorbs the active material-alkali metals well, particularly lithium, does not undergo pulverization on charging and maintains the form of the electrode stably.

Another object of the present invention is to provide a rechargeable negative electrode that can absorb a large amount of alkali metal per unit volume, hence has a large dicharge capacity, and moreover has a long life, enduring repeated charge and discharge cycles.

A further object of the present invention is to provide a rechargeable electrochemical apparatus having a long charge-and-discharge life and a high voltage. A still further object is to provide a rechargeable electrochemical apparatus having a high energy density.

The aforesaid objects of the present invention can be achieved by using, as negative electrode material, an alloy comprising (1) at least one metal selected from the group consisting of bismuth, indium, tin and lead and (2) zinc or zinc and cadmium.

DETAILED DESCRIPTION OF THE EMBODIMENTS

When charging and discharging are conducted in a nonaqueous electrolyte containing alkali metal ions with the above mentioned alloy used as the negative electrode, the electrode absorbs the alkali metal ions from the electrolyte as the result of charging, forming an alloy with the alkali metal, and desorbs the absorbed alkali metal to the electrolyte as ions as the result of discharging. Accordingly, charging and discharging can be conducted reversibly. During the charging stage there occurs no short-circuiting between the positive and negative electrodes due to dendrite-like precipitation of the alkali metal on the surface of the negative electrode, nor disintegration of the negative electrode due to pulverization.

Among the components of the alloy mentioned above, zinc plays the role of a so-called binder, preventing the pulverization of the negative electrode that would accompany the absorption of the alkali metal caused by charge. Cadmium assists the above role. Bismuth, indium, tin and lead serve to increase the absorbed amount of alkali metal and increase the quantity of electricity in charging and discharging. Accordingly, for applications where the quantity of electricity in charging and discharging is not large and the life in charging and discharging is important, a larger proportion of zinc or zinc and cadmium is favorable. On the other hand, for applications where the quantity of electricity is required to be large, the proportion of zinc or zinc and cadmium is preferably not too large.

The mechanism of reaction occurring when the alloy of the present invention is used as the negative electrode is assumed to be as follows. When lithium is used as the alkali metal, during charging lithium ions in the electrolyte react at the alloy surface, forming a king of intermetallic compound or an alloy of lithium with bismuth, indium, tin or lead in the alloy, and the lithium then diffuses into the alloy of the negative electrode, forming a lithium alloy. Accordingly, the charge reaction takes place at a more noble potential than that of metallic lithium, and the absorption of lithium proceeds until the amount of lithium in the alloy reaches saturation and the potential of the alloy becomes equal to that of metallic lithium.

When a tin-zinc alloy comprising 60% by weight of tin and 40% by weight of zinc (hereinafter expressed as [Sn(60)-Zn(40)]) is used, the charging and discharging reaction in electrolyte containing lithium ions may be expressed by equation (1):

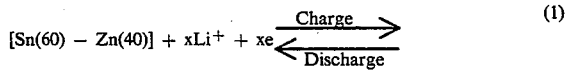 (1)

$$[\text{Sn}(60) - \text{Zn}(40)]\text{Li}_x$$

wherein $[\text{Sn}(60)\text{-Zn}(40)]\text{Li}_x$, indicates a tin-zinc-lithium alloy formed by charging.

As to the range of charging and discharging, the discharging is not required to be conducted until the lithium disappears completely from the negative electrode as in equation (1); it may be conducted such that the amount of lithium absorbed by the negative electrode is altered, as in equation (2).

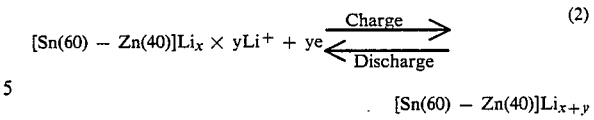 (2)

$$[\text{Sn}(60) - \text{Zn}(40)]\text{Li}_{x+y}$$

The negative electrode alloy of the present invention may be integrated into an electrochemical apparatus in the form of the above-mentioned alloy. But it may also be integrated thereinto as an alloy that has absorbed active material-alkali metal, for example, a lithium alloy that has absorbed lithium. Further, instead of making the alloy absorb lithium electrochemically, it may be prepared as a lithium alloy according to alloying procedures. The content of lithium then is the saturation amount that can be absorbed electrochemically as mentioned above. Although the saturation amount varies depending on the alloy composition, it is about 20% by weight as lithium.

One example of the alloy for the negative electrode of this invention is a binary alloy of Zn and Bi, In, Sn or Pb. In a binary alloy of Zn with Sn, In or Pb, the Zn content is preferably 20 to 80% by weight. For applications where charging-and-discharging life is important, a large content of Zn is preferable. But, for applications where high energy density is important, the Zn content is preferably 20 to 70% by weight, particularly 30 to 60% by weight. A particularly preferable example is a Sn-Zn alloy comprising 30 to 60% by weight of Zn and 70 to 40% by weight of Zn. In Bi-Zn alloys, the Zn content is preferably 50 to 85% by weight.

As to a ternary, quarternary or higher multiple component alloy, mention may be made of an alloy of Zn with at least two metals selected from the group consisting of Sn, Bi, Pb, and In. In this case, the Zn content is preferably 20 to 80% by weight and the sum of the contents of the other components is preferably 80 to 25% by weight. A Zn content of 20 to 75% by weight is particularly preferable. When Bi is used, its content should be no higher than 50% by weight and is preferably as low as possible. Bi effectively helps the alloying of Pb, which is difficult to alloy with Zn. Preferred examples are a Sn-Pb-Zn alloy comprising 30 to 60% by weight of Zn, 10 to 20% by weight of Pb and the remaining portion of Zn, a Sn-In-Sn alloy comprising 30 to 60% by weight of Zn, 3 to 10% by weight of In and the remaining portion of Sn, and Sn-Pb-In-Zn alloy comprising 30 to 60% by weight of Zn, 3 to 10% by weight of In, 10 to 20% by weight of Pb and the remaining portion of Sn.

In the above-mentioned Zn alloy, a part of the Zn may be replaced with Cd. Combined use of Zn and Cd has the effect of somewhat increasing the quantity of electricity in charging and discharging. But, since Cd has the problem of possible environmental pollution, it is preferable not to use it.

Among the various above-mentioned alloys, Sn-Zn alloys are the most practical from the viewpoint of performance and cost. Pb, In or Cd may be added thereto. Particularly, In facilitates the production of the electrode. A preferable content of In is 3 to 10% by weight.

As to a positive electrode for constituting a rechargeable electrochemical apparatus in combination with the negative electrode of this invention, those that have reversibility of charge-and-discharge are used. An example is a positive electrode having $\text{MoO}_3$, $\text{TiS}_2$, $V_6O_{13}$, $Cr_3O_8$, $TiO_2$, $WO_3$, $TaS_2$, $NaCrS_2$ or the like as the active material.

A combination of a well-known carbonaceous electrode, such as a graphite electrode or an activated carbon electrode as used in an electric double layer capacitor, with the negative electrode of this invention can be used, for example, as the backup power source for a memory.

As to the nonaqueous electrolyte, organic electrolytes are favorably used. As the organic solvent and the alkali metal salt solute, there may be used, respectively, the well-known ones used in organic electrolyte batteries. Examples of the former include propylene carbonate, γ-butyrolactone, ethylene carbonate, 1,2-dimethoxyethane, tetrahydrofuran, 2-methyltetrahydrofuran and 1,3-dioxolan. Examples of the latte include lithium salts such as $LiClO_4$, $LiBF_4$, $LiAsF_6$, $LiSO_3CF_3$, and $LiPF_6$, sodium salts such as $NaClO_4$, and potassium salts such as $KPF_6$. These organic solvents and solutes can each be used, respectively, alone or in a combination of several thereof.

As to the nonaqueous electrolyte, there may also be used a solid electrolyte of alkali metal ion conductivity. As an example of solid electrolyte, e.g. that of lithium ion conductivity, mention may be made of $Li_3N$ and $Li_2O \cdot Li_4SiO_4 \cdot Li_3PO_4$.

BEST MODE FOR CARRYING OUT THE INVENTION

Figure 1:
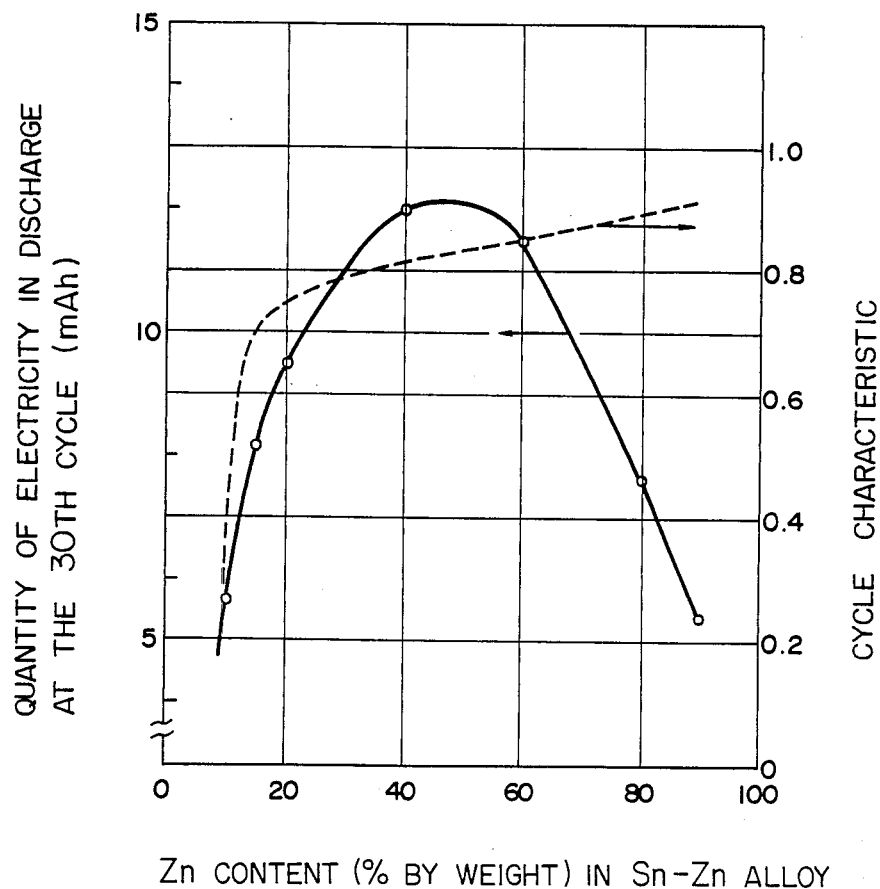
FIG. 1 shows, for Sn-Zn alloys, the relationship between Zn content of the alloy and the quantity of electricity discharged as well as the cycle characteristic when said alloys are used as the negative electrode.

The characteristics of the alloy of the present invention as a rechargeable negative electrode will be illustrated below in comparison with those of metals and alloys of Comparative Examples.

The apparatus used for evaluating the characteristics of the negative electrode consisted of a battery jar having a test electrode and an opposite electrode inserted therein, a battery jar having a reference electrode inserted therein, and a liquid connecton bridge connecting the two jars. The electrolyte used was propylene carbonate containing 1 mol/l of lithium perchlorate ($LiClO_4$) dissolved therein. The test electrodes were prepared from various metals or alloys, 1 cm square and 1 mm thick; a nickel ribbon was attached thereto as a lead wire. The opposite electrode used was a positive electrode containing $TiS_2$ as the active material, which enabled reversible charging and discharging; the reference electrode used was metallic lithium.

The test procedure was as follows: by using the test electrode and the opposite electrode as the negative and positive electrode, respectively, charging was carried out at a constant current of 3mA until the potential of the test electrode reched 50mV against that of the reference electrode; subsequently, discharging was carried out at a constant current of 3mA until the potential of the test electrode reached 1.0 V against that of the reference electrode; the above charging and discharging was then carried out repeatedly.

Example 1

For the various metals and alloys, shown in the Table the quantity of electricity in discharged at the 5th and the 30th cycle as well as the cycle characteristic, the quotient obtained by dividing the quantity of electricity at the 30th cycle by that at the 5th cycle.

When Sn, Pb, Bi and In respectively, were used for the negative electrode as the simple metal, the deposited metal was pulverized and fell off of the electrode during the course of repeated charging-and-discharging cycles, and so they could not be used as rechargeable electrodes. Pulverization also occurred in the case of Ag. Al gave rise to pulverization and falling off during the charge of the 1st cycle.

On the other hand, the alloys of this invention (Nos. 1 to 12 and Nos. 14 to 19) gave rise to no pulverization of the electrode and had large cycle characteristic values and large quantities of electricity discharged in the 30th cycle. The Sn-Cd alloy of the Comparative Example (No. 13) gave rise to no pulverization of the electrode and showed a good current efficiency of 98 to 100% similar to the alloy of this invention; but the quantity of electricity discharged began to fall after about 20 cycles.

Both Zn and Cd undergo no pulverization, even after repeated charging-and-discharging and maintain stably the shape of the electrode, but discharge a small quantity of electricity. Further, they showed a large variation in the quantity of electricity discharged, even for electrodes of fixed apparent surface area, depending on the roughness of the surface. It is considered that Zn or Cd have, by themselves, only small capacities for absorbing and desorbing lithium accompanying charging and discharging.

It is believed that the reason the alloy of the present invention comprising Zn or Zn and Cd undergoes no pulverization, even after repeated charging and discharging is because the Zn or Cd plays the role of a binder.

As is apparent from the Table, the quantity of electricity on discharge is large when alloys containing both Zn and Cd or multiple component alloys are used. This is presumably because the crystal grain interface of each component in the alloy exerts a great influence on the diffusion of lithium that accompanies charging and discharging.

| No. | Alloy or metal | Quantity of electricity in discharge at 5th cycle (mAh) | Quantity of electricity in discharge at 30th cycle (mAh) | Cycle characteristic |
| --- | --- | --- | --- | --- |
| 1 | [Sn(60)—Zn(40)] | 14.9 | 12.0 | 0.81 |
| 2 | [In(60)-Zn(40)] | 14.3 | 11.7 | 0.82 |
| 3 | [Pb(60)-Zn(40)] | 14.5 | 11.3 | 0.78 |
| 4 | [Bi(30)-Zn(70)] | 11.6 | 8.4 | 0.72 |
| 5 | [Sn(30)-Pb(30)-Zn(40)] | 15.3 | 12.4 | 0.81 |
| 6 | [Sn(30)-In(30)-Zn(40)] | 15.0 | 12.3 | 0.82 |
| 7 | [Pb(30)-In(30)-Zn(40)] | 14.3 | 11.7 | 0.82 |
| 8 | [Sn(40)-Bi(20)-Zn(40)] | 14.4 | 11.2 | 0.78 |
| 9 | [Pb(40)-Bi(20)-Zn(40)] | 12.2 | 9.3 | 0.76 |
| 10 | [In(40)-Bi(20)-Zn(40)] | 13.2 | 10.3 | 0.78 |
| 11 | [Pb(50)-Zn(25)-Cd(25)] | 14.0 | 12.2 | 0.87 |
| 12 | [Sn(60)-Zn(20)-Cd(20)] | 15.3 | 13.0 | 0.85 |
| 13 | [Sn(60)-Cd(40)] | 18.4 | 7.2 | 0.39 |
| 14 | [Bi(60)-Zn(20)-Cd(20)] | 12.8 | 9.2 | 0.72 |
| 15 | [In(60)-Zn(20)-Cd(20)] | 14.7 | 12.5 | 0.85 |
| 16 | [Pb(30)-Sn(30)-Zn(20)-Cd(20)] | 16.0 | 14.2 | 0.89 |
| 17 | [Bi(30)-Sn(30)-Zn(20)-Cd(20)] | 14.6 | 11.7 | 0.80 |
| 18 | [Pb(30)-In(20)-Zn(20)-Cd(20)] | 16.0 | 14.4 | 0.90 |
| 19 | [Sn(30)-In(30)-Zn(20)-Cd(20)] | 16.5 | 15.2 | 0.92 |
| 20 | Sn | 2.2 | 0.53 | 0.24 |
| 21 | Zn | 1.2 | 1.1 | 0.92 |
| 22 | Cd | 1.3 | 1.2 | 0.92 |
| 23 | Pb | 2.5 | 0.23 | 0.09 |
| 24 | Bi | 2.2 | 0.16 | 0.07 |
| 25 | In | 2.0 | 0.21 | 0.11 |
| 26 | Ag | 10.3 | 1.2 | 0.12 |
| 27 | Al | 2.6 | 0.2 | 0.08 |

Example 2

In this example there are illustrated the characteristics of binary alloys of Zn with Sn, In or Pb examined in the same manner as in Example 1.

Figure 2:
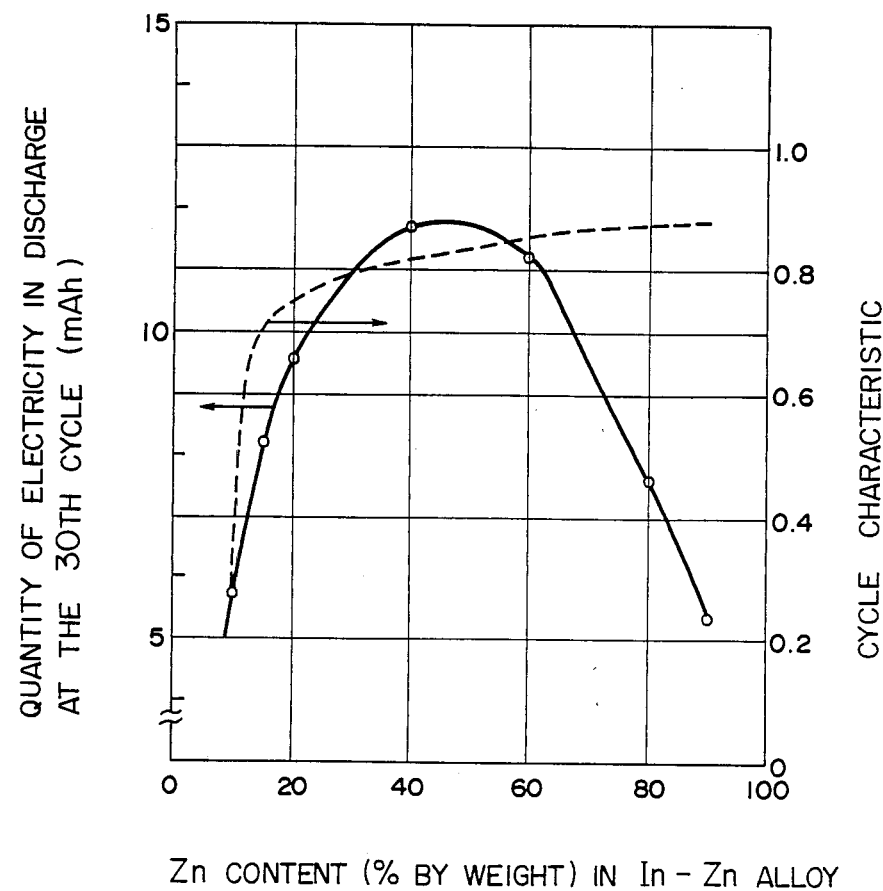
FIGS. 2, 3 and 4 show, respectively the same information for In-Zn alloys, Pb-Zn alloys and Bi-Zn alloys, the relationship between Zn content and the quantity of electricity discharged as well as the cycle characteristic.
Figure 3:
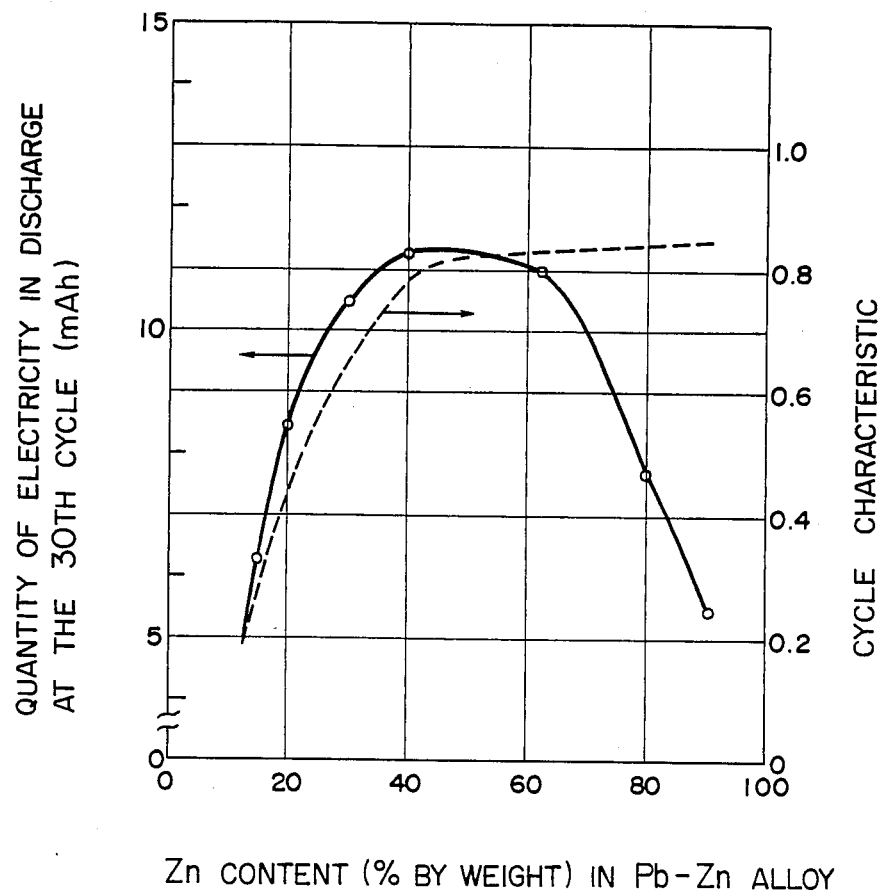

FIG. 1 shows, for Sn-Zn alloys, the relationship between Zn content and the quantity of electricity discharged at the 30th cycle as well as the cycle characteristic. FIG. 2 shows, for In-Zn alloys, the relationship between Zn content and the quantity of electricity discharged at the 30th cycle as well as the cycle characteristic. FIG. 3 shows similar characteristics for Pb-Zn alloys.

These Figures reveal that when the content of Zn is small, the quantity of electricity discharged is small and the cycle characteristic is poor. This is because pulverization of the electrode occurs as the result of charging and discharging. On the other hand, with increasing content of Zn the cycle characteristic is improved but the quantity of electricity discharged is lowered. Thus, for Sn-Zn alloys, In-Zn alloys and Pb-Zn alloys, the content of Zn is preferably 20 to 70%, particularly 30 to 60%, when the quantity of electricity in discharged is taken into consideration. When charging and discharging cycle life is regarded as more important than the quantity of electricity discharged, alloys with the higher range of Zn content of up to 80% by weight may be used.

Pb-Zn alloys are difficult prepare by conventional methods. Accordingly, as will be described later, it is preferable to add thereto other components, such as Cd, Sn, In and Bi. In this Example, Pb-Zn alloys here prepared by means of sputtering.

Example 3

Figure 4:
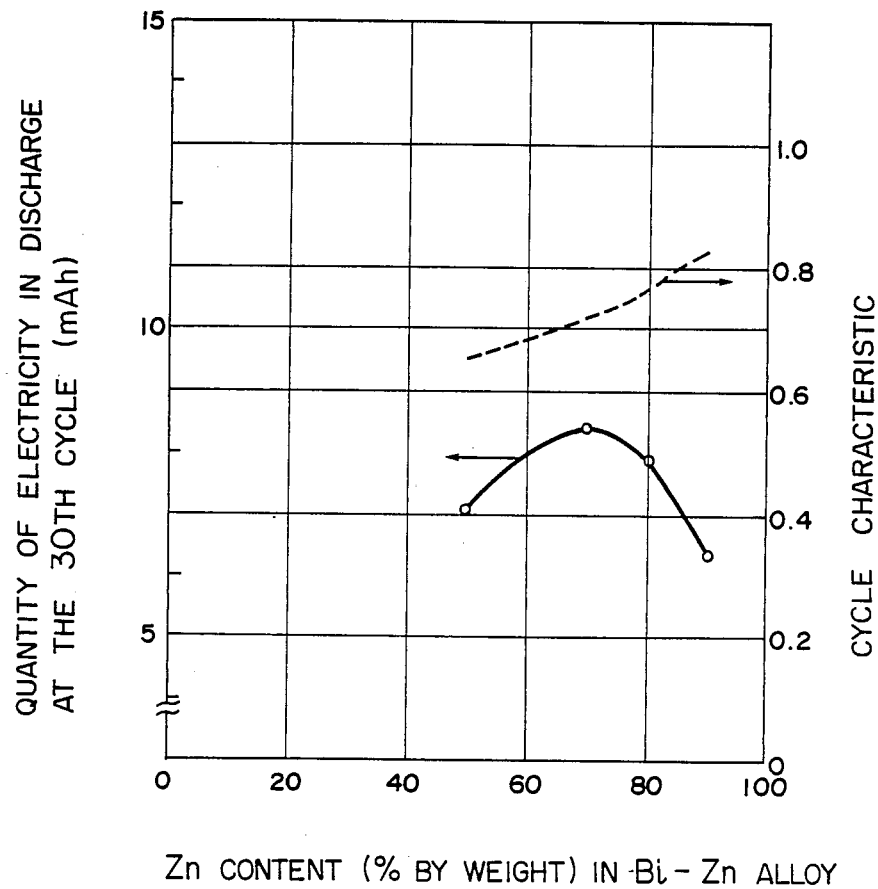

FIG. 4 shows, for Bi-Zn alloy, similar characteristics to those described above. Bi-Zn alloys are inferior to the binary alloys shown in Example 2. The preferred content of Zn is 50 to 85% by weight, particularly 60 to 80% by weight; consequently, the preferred content of Bi is 50 to 15% by weight, particularly 40 to 20% by weight.

Example 4

In this Example there are illustrated, for alloys of Zn with at least two metals selected from the group consisting of Sn, Pb and In, similar characteristics to those described above.

Figure 5:
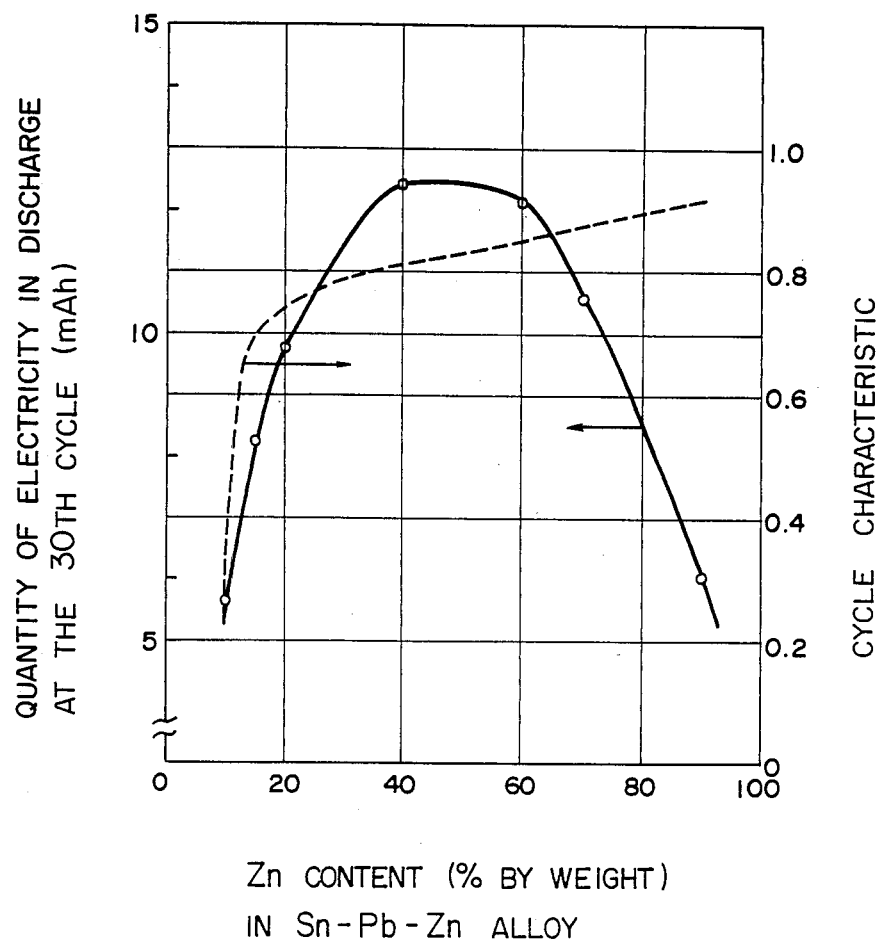
FIG. 5 shows, for Sn-Pb-Zn alloys (wherein the weight ratio of Sn to Pb is 1:1), the relationship between Zn content and the quantity of electricity discharged as well as the cycle characteristic.
Figure 6:
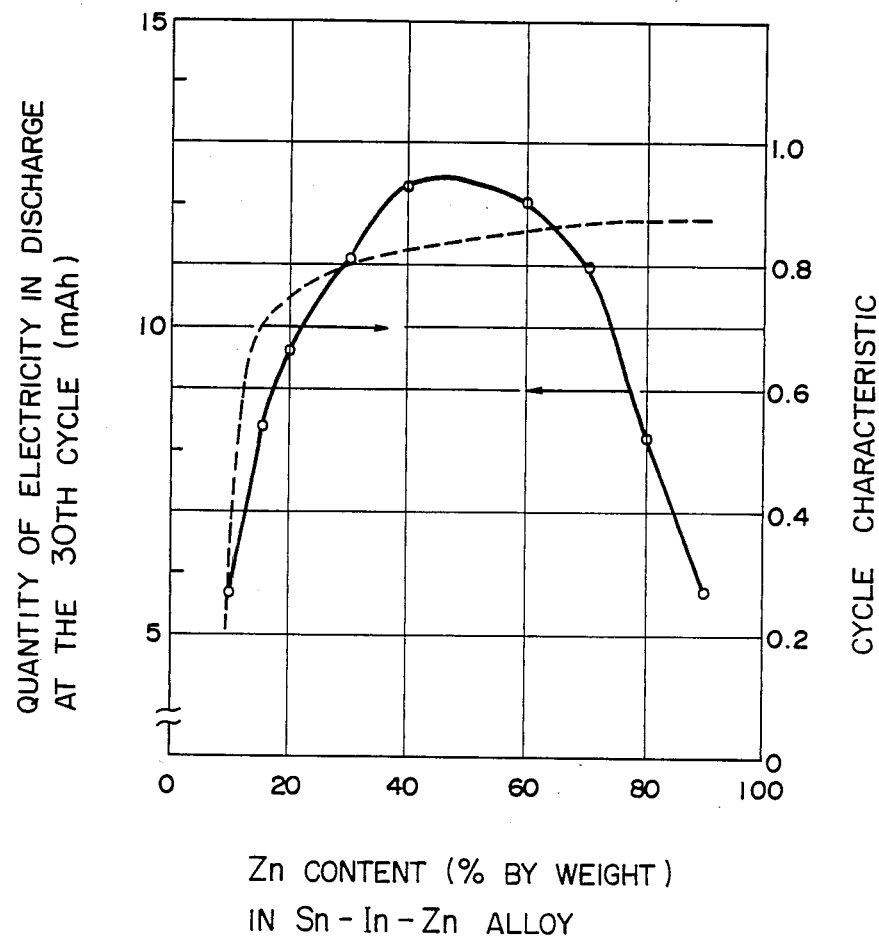
FIGS. 6 and 7 show, respectively for Sn-In-Zn alloys (wherein the weight ratio of Sn to In is 1:1) and for In-Pb-Zn alloys (wherein the weight ratio of In to Pb is 1:1), the relationship between Zn content and the quantity of electricity discharged as well as the cycle characteristic.
Figure 7:
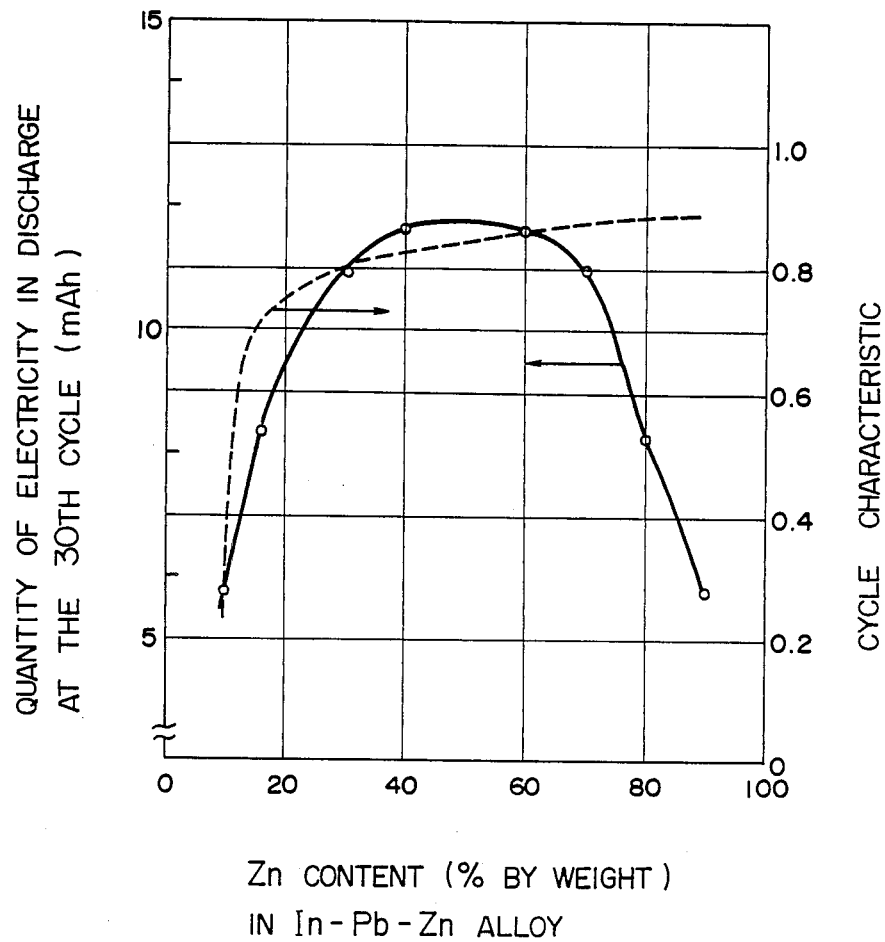

Thus, FIG. 5 shows, for Sn-Pb-Zn alloys wherein the weight ratio of Sn to Pb is 1:1, the relationship between the content of Zn and the quantity of electricity in discharged as well as the cycle characteristic. FIG. 6 shows, for Sn-In-Zn alloys wherein the weight ratio of Sn to In is 1:1, the relationship between the content of Zn and the quantity of electricity discharged at the 30th cycle as well as the cycle characteristic. FIG. 7 shows, the Pb-In-Zn alloys wherein the weight ratio of Pb to In is 1:1, the relationship between the content of Zn and the quantity of electricity discharged at the 30th cycle as well as the cycle characteristic.

Also in these ternary alloys, the cycle characteristic is lowered as the content of Zn is decreased and the quantity of electricity discharged is decreased as the content of Zn is increased. This is because Zn plays the role of a binder in the alloy. The preferred content of Zn in these alloys is 20 to 75% by weight, particularly 30 to 70% by weight. On the other hand, when charging and discharging cycle life is important, a Zn content of up to 80% by weight may be used.

Sn-Pb-Zn alloys give an increased quantity of electricity discharging as compared with the Sn-Zn alloys of Example 2. This is presumably because the diffusion in lithium along the phase interface in the alloy becomes easier as the number of components of the alloy increases.

The above example described the results obtained with alloys wherein the contents of two components other than Zn were equal. For Sn-Pb-Zn alloys, similar results to those mentioned above were obtained within the weight ratio range of Sn to Pb of 4:1 to 1:2. Also, similar results to those mentioned above were obtained for Sn-In-Zn alloys in the weight ratio range of Sn to In of 1:9 to 9:1, and for Pb-In-Zn alloys in the weight ratio range of Pb to In of 3:1 to 1:9.

Thus, in Sn-In-Zn alloys, good characteristics are exhibited when the Zn content is 20 to 70% by weight and the remaining portion is Sn and In, Sn/In. The ratio being in the range of 1/9 to 9/1. The reason that the ratio of Sn to In can be thus varied within a wide range is presumably that both Sn and Id alloy well with Zn. On the other hand, in alloys containing Pb, the ratios Pb/In and Sn/Pb cannot be varied so widely This is because Pb alloys with difficulty with Zn. Since Sn and In have the same function as mentioned above, a part of Sn in Sn-Pb-Zn alloys may be replaced with In, and a part of In in In-Pb-Zn alloys may be replaced with Sn.

Example 5

The characteristics of alloys comprising Zn, Bi and at least one metal selected from the group consisting Sn, In and Pb will be described.

Figure 8:
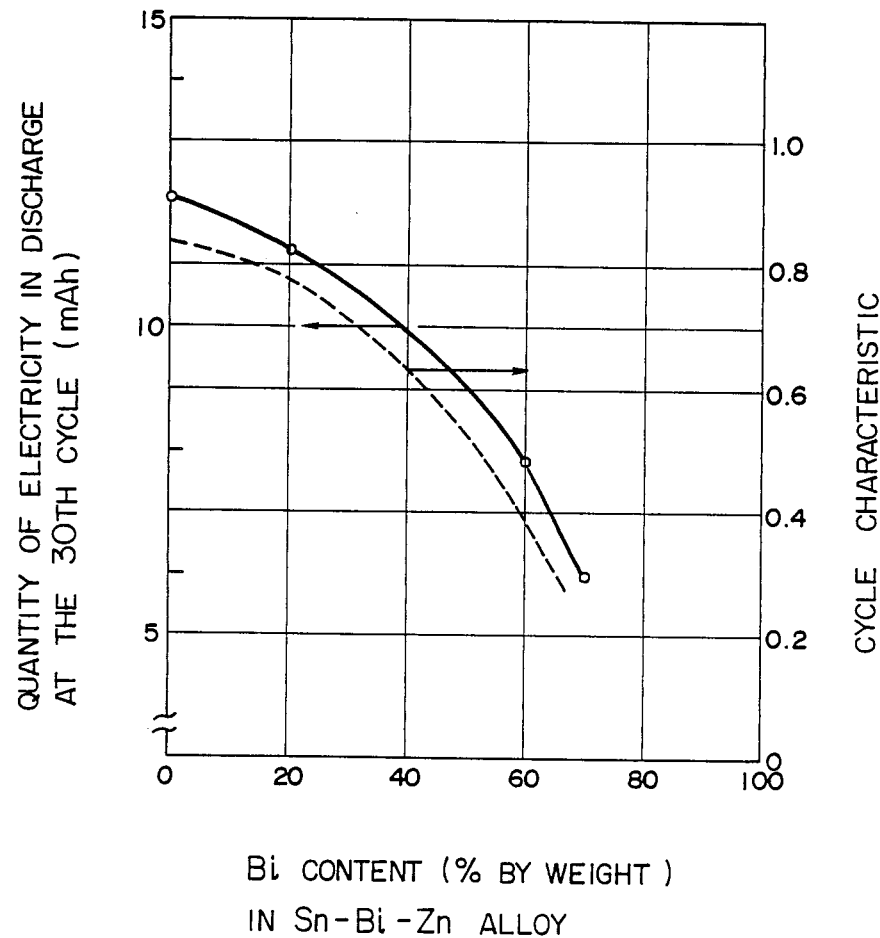
FIG. 8 shows, for Sn-Bi-Zn alloys (wherein the ratio of Sn to Zn is 1:1), the relationship between Bi content and the quantity of electricity discharged at the 30th cycle, as well as the cycle characteristic.

FIG. 8 shows, for Sn-Bi-Zn alloys comprising Zn and Sn in the weight ratio of Zn to Sn of 1:1, the relationship between the content of Bi and the quantity of electricity discharged at the 30th cycle as well as the cycle characteristic. No particular effect is observed by adding of Bi to Sn-Zn alloys. Similar tendencies were observed also in In-Bi-Zn alloys and Pb-Bi-Zn alloys. The addition of Bi contributes to facilitating the alloying of Pb which is difficult alloy by itself with Zn; its content should not be more than 50% by weight and is preferably kept as small as possible.

Example 6

The characteristics of alloys comprising Zn, Cd and at least one metal selected from the group consisting of Pb, Sn, Bi and In will be described.

Figure 9:
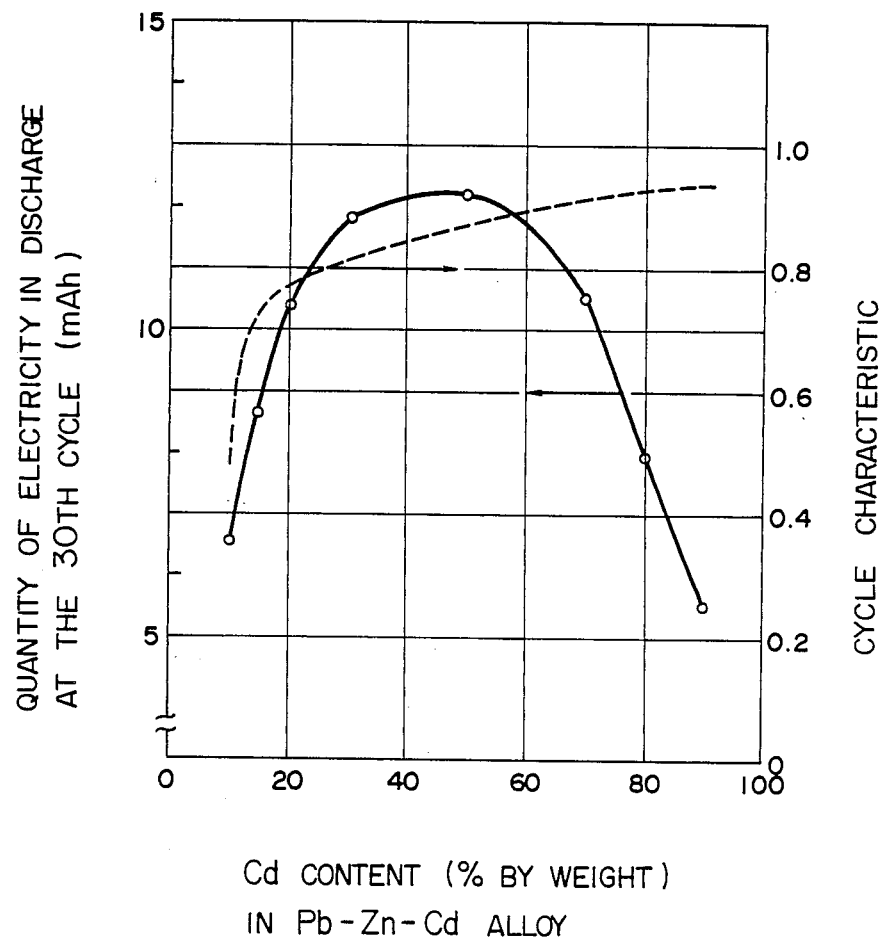
FIG. 9 shows, for Pb-Zn-Cd alloys (wherein the weight ratio of Zn to Cd is 1:1), the relationship between the sum of the contents of Zn and Cd and the quantity of electricity discharged as well as the cycle characteristic.
Figure 10:
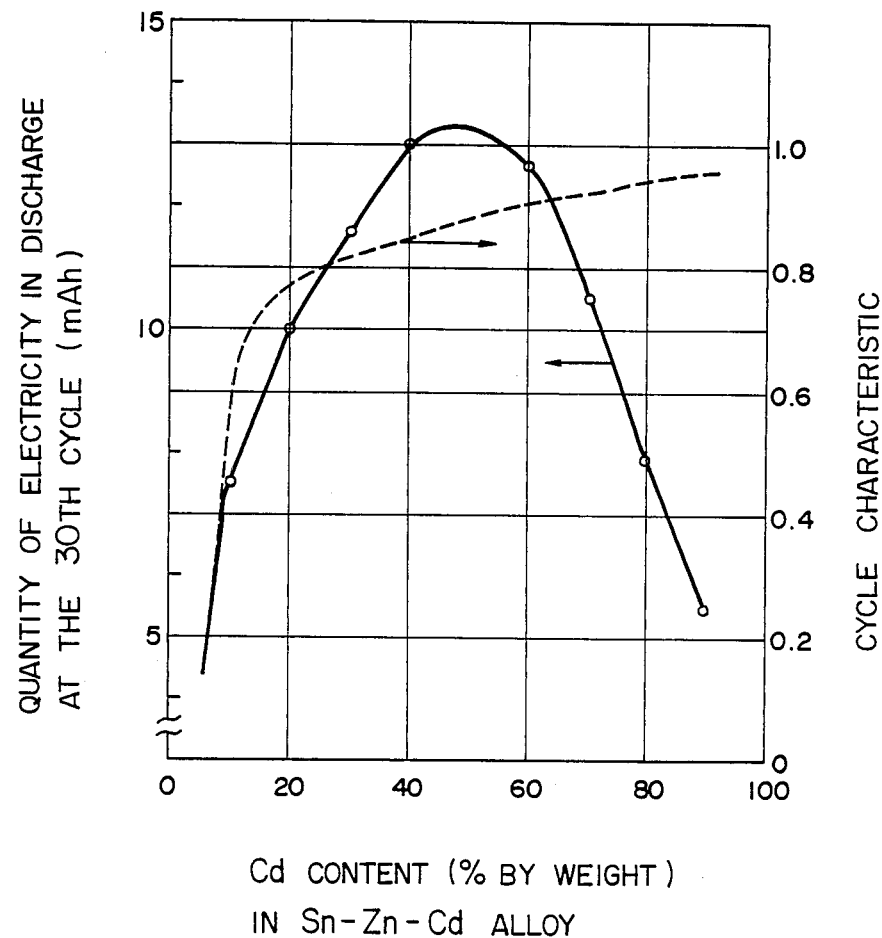
FIGS. 10 and 11 show, respectively for Sn-Zn-Cd alloys (wherein the weight ratio of Zn to Cd is 1:1) and Bi-Zn-Cd alloys (wherein the weight ratio of Zn to Cd is 1:1), the relationship between the sum of the contents of Zn and Cd and the quantity of electricity discharged as well as the cycle characteristic.
Figure 11:
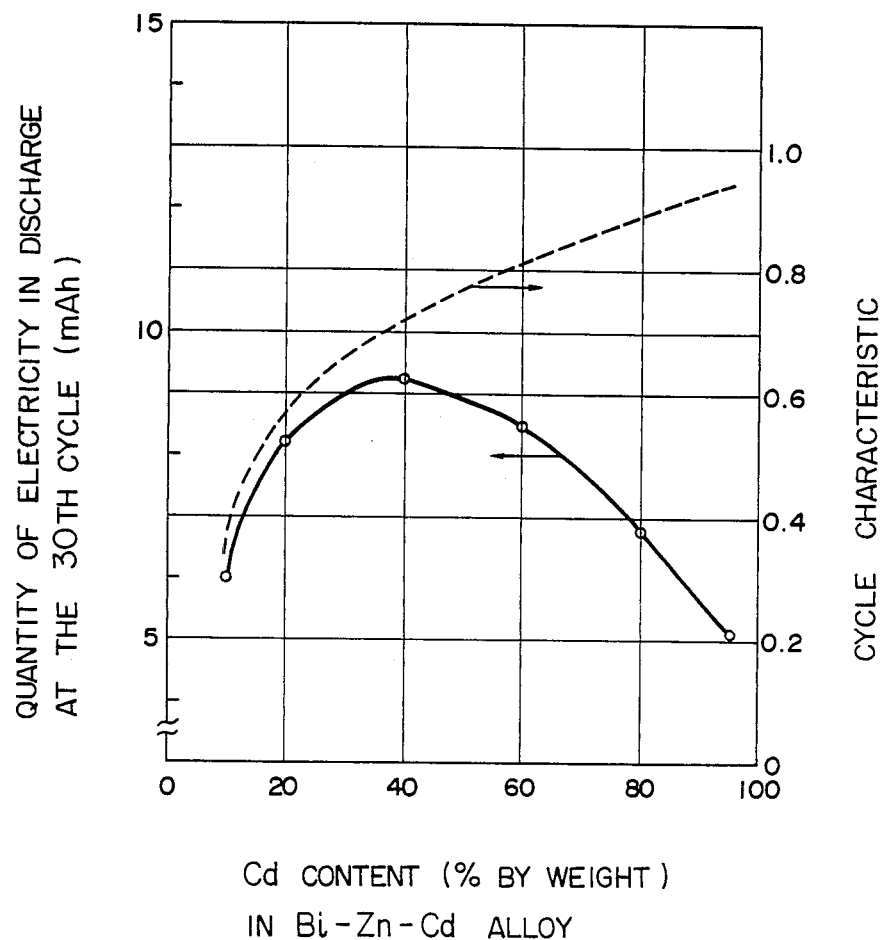

FIGS. 9, 10 and 11 show, for Pb-Zn-Cd alloys Sn-Zn-Cd alloys and Bi-Zn-Cd alloys respectively, the relationship between the sum of the contents of Zn and Cd and the quantity of electricity discharged at the 30th cycle as well as the cycle characteristic. In each of the alloys the weight ratio of Zn to Cd was fixed at 1:1.

FIGS. 9 and 10 reveal that, for Pb-Zn-Cd alloys and Sn-Zn-Cd alloys, good characteristics are exhibited when the sum of contents of Zn and Cd is in a range of 15 to 75% by weight. Bi-Zn-Cd alloys, although inferior to the above-mentioned alloys in the quantity of electricity discharged, show good characteristics when the sum of the contents of Zn and Cd is in the range of 15 to 75% by weight. In these alloys also, when charging and discharging cycle life is regarded as important, the sum of the contents of Zn and Cd of up to 80% by weight is allowable.

Next, when the Sn-Zn alloys of FIG. 1 are compared with the Sn-Zn-Cd alloys of FIG. 10, it can be seen that the latter alloys wherein a part of Zn has been replaced with Cd show improved quantity of electricity discharged and cycle characteristics. When Sn-Cd alloys (No. 13) and Sn-Zn-Cd alloys (No. 12), shown in the above-mentioned Table, are compared with each other, the latter show superior performance. From these facts it can be said that, although Zn and Cd each play the role of a binder in the alloys, the performance of alloy is improved by incorporating both of them thereinto.

In-Zn-Cd alloys showed characterizations similar to those of Sn-Zn-Cd alloys, and exhibited good characteristics when the sum of contents of Zn and Cd was in the range of 15 to 75% by weight.

Example 7

The characteristics of alloys comprising both Zn and Cd, the proportion of Cd being varied, will be described.

Figure 12:
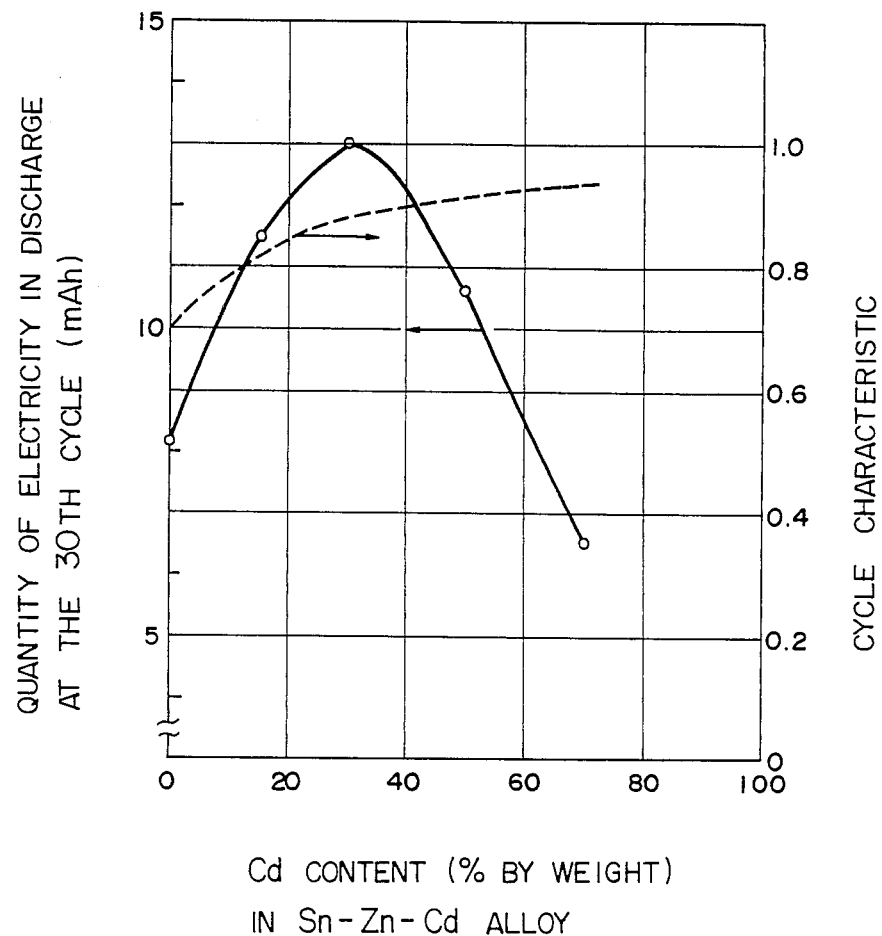
FIG. 12 shows, for Sn-Zn-Cd alloys (wherein the Zn content is 15% by weight), the relationship between the Cd content and the quantity of electricity discharged as well as the cycle characteristic.

FIG. 12 shows the characteristics of Sn-Zn-Cd alloys wherein the content of Zn is fixed and the content of Cd is varied. A Cd content of 50% by weight or less is preferable.

Also, in In-Zn-Cd alloys and Pb-Zn-Cd alloy, good characteristics were exhibited at the Cd content of 50% by weight or less when the content of Zn was fixed at 15% by weight.

In the above Examples the characteristics of alloy negative electrodes in electrochemical cells comprising a combination of a specified positive electrode and electrolyte were shown. But the positive electrode and the electrolyte are not restricted thereto. As the negative electrode active material, examples were described wherein lithium, most common and most practical, was used. But the alloy of this invention acts as a rechargeable negative electrode also when sodium or potassium are used as negative-electrode active materials.

The alloy of the present invention reversibly absorbs and desorbs alkali metal ions, as the result of charging and discharging, in nonaqueous electrolytes containing alkali metal ions, so that it endures repeated charging and discharging and gives a rechargeable negative electrode having a long charge-and-discharge life. Accordingly, it can be utilized in rechargeable electrochemical apparatus including, particularly, a secondary battery using lithium as negative-electrode active material. Further, by suitable choice of alloy composition a secondary battery of high energy density can be obtained.

What is claimed is:

1. A rechargeable electrochemical apparatus comprising a nonaqueous electrolyte containing an alkali metal in ionic form, a reversible positive electrode and a rechargeable negative electrode, said rechargeable negative electrode comprising an alloy that absorbs on charging said alkali metal in ionic form, forming an alloy with the alkali metal, and desorbs on discharging the alkali metal into the electrolyte as ions, wherein said rechargeable negative electrode contains no aluminum and comprises an alloy comprised of (1) at least one metal selected from the group consisting of Sn, In, Pb and Bi and (2) Zn or Zn and Cd, which alloy contains, at least in the charged state, the alkali metal.

2. The rechargeable electrochemical apparatus according to claim 1, wherein said alloy contains alkali metal in the discharged state.

3. The rechargeable electrochemical apparatus according to claim 1, wherein said alkali metal is lithium.

4. The electrochemical apparatus according to claim 1, wherein said alloy is an alloy comprising Zn and Sn.

5. The electrochemical apparatus according to claim 1, wherein said alloy is an alloy comprising Sn, Zn and Cd.

6. The electrochemical apparatus according to claim 1, wherein said alloy is an alloy comprising sn, Zn and Cd.

7. The electrochemical apparatus according to claim 1, wherein said alloy is an alloy comprising Zn, Cd and at least one metal selected from the group consisting of In and Pb.

8. The electrochemical apparatus according to claim 1, wherein said apparatus contains no alkali metal in the metallic state and wherein charging and discharging proceed at a more noble potential than that of the metallic alkali metal such that the amount of alkali metal in said alloy does not exceed a saturation amount and said apparatus never contains alkali metal in the metallic state.

9. The electrochemical apparatus according to claim 1, wherein the content of Zn in said alloy ranges from 20 to 70% by weight.

10. The rechargeable electrochemical apparatus according to claim 1, wherein said alloy is an alloy comprising Zn and Sn.

11. A rechargeable electrochemical apparatus comprising a nonaqueous electrolyte containing an alkali metal in ionic form, a reversible positive electrode, and a rechargeable negative electrode, said rechargeable negative electrode comprising an alloy that absorbs on charging said alkali metal in ionic form from the electrolyte, forming an alloy with the alkali metal, and desorbs on discharging the alkali metal into the electrolyte as ions, wherein said rechargeable negative electrode contains no aluminum and comprises an alloy of Sn and Zn, which alloy contains, at least in the discharged state, the alkali metal.

12. The electrochemical apparatus according to claim 11, wherein said apparatus contains no alkali metal in the metallic state and wherein charging and discharging proceed at a more noble potential than that of the metallic alkali metal such that the amount of alkali metal in said alloy does not exceed a saturation amount and said apparatus never contains alkali metal in the metallic state.

13. The electrochemical apparatus according to claim 11, wherein the content of Zn in said alloy of Sn and Zn ranges from 20 to 70% by weight.

14. The process of providing a rechargeable negative electrode in a rechargeable electrochemical apparatus comprising a reversible positive electrode and a nonaqueous electrolyte containing an alkali metal in ionic form, the process comprising providing a rechargeable negative electrode comprising an alloy that absorbs on charging said alkali metal in ionic form, forming an alloy with the alkali metal, and desorbs on discharging the alkali metal into the electrolyte as ions, wherein said rechargeable negative electrode contains no aluminum and comprises an alloy comprised of (1) at least one metal selected from the group consisting of Sn, In, Pb and Bi and (2) Zn or Zn and Cd, which alloy contains, at least in the charged state, the alkali metal.

15. The process of providing a rechargeable negative electrode in a rechargeable electrochemical apparatus comprising a reversible positive electrode and a nonaqueous electrolyte containing an alkali metal in ionic form, the process comprising providing a rechargeable negative electrode comprising an alloy that absorbs on charging the alkali metal in ioni form from the electrolyte, forming an alloy with the alkali metal, and desorbs on discharging the alkali metal into the electrolyte as ions, wherein said rechargeable negative electrode contains no aluminum and comprises an alloy of Sn and Zn, which alloys contains, at least in the discharged state, the alkali metal.

* * * * *

UNITED STATES PATENT AND TRADEMARK OFFICE
CERTIFICATE OF CORRECTION

PATENT NO. : 4,851,309

DATED : July 25th, 1989

INVENTOR(S) : Yoshinori TOYOGUCHI et al.

It is certified that error appears in the above-identified patent and that said Letters Patent is hereby corrected as shown below:

Please cancel claims 6 and 10.

Please add new claim 16 as follows:

--16. The electrochemical apparatus according to claim 1, wherein said alloy comprises Zn, Sn and at least one metal selected from the group consisting of In and Pb.--

Signed and Sealed this

Fifteenth Day of September, 1992

*Attest:*

DOUGLAS B. COMER

*Attesting Officer*  *Acting Commissioner of Patents and Trademarks*